(12) United States Patent
Takagi

(10) Patent No.: US 10,400,094 B2
(45) Date of Patent: Sep. 3, 2019

(54) RUBBER COMPOSITION FOR TIRES

(71) Applicant: The Yokohama Rubber Co., LTD., Minato-ku, Tokyo (JP)

(72) Inventor: Ryosuke Takagi, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 0 days.

(21) Appl. No.: 16/075,121

(22) PCT Filed: Jan. 26, 2017

(86) PCT No.: PCT/JP2017/002688
§ 371 (c)(1),
(2) Date: Aug. 2, 2018

(87) PCT Pub. No.: WO2017/135143
PCT Pub. Date: Aug. 10, 2017

(65) Prior Publication Data
US 2019/0048173 A1    Feb. 14, 2019

(30) Foreign Application Priority Data
Feb. 4, 2016 (JP) ................. 2016-019912

(51) Int. Cl.
| | | |
|---|---|---|
| *B60C 1/00* | (2006.01) | |
| *C08K 3/36* | (2006.01) | |
| *C08L 9/00* | (2006.01) | |
| *C08L 9/06* | (2006.01) | |
| *C08L 25/08* | (2006.01) | |
| *C08L 45/00* | (2006.01) | |
| *C08L 91/00* | (2006.01) | |
| *C08F 236/06* | (2006.01) | |

(52) U.S. Cl.
CPC .................. *C08L 9/06* (2013.01); *B60C 1/00* (2013.01); *B60C 1/0016* (2013.01); *B60C 1/0025* (2013.01); *C08K 3/36* (2013.01); *C08L 9/00* (2013.01); *C08L 25/08* (2013.01); *C08L 45/00* (2013.01); *C08L 91/00* (2013.01); *C08F 236/06* (2013.01); *C08K 2201/006* (2013.01); *Y02T 10/862* (2013.01)

(58) Field of Classification Search
CPC .... C08L 9/06; C08L 45/00; C08L 9/00; C08L 25/08; C08L 91/00; C08K 3/36; C08K 2201/006; B60C 1/0016; B60C 1/0025; B60C 1/00; C08F 236/06
USPC ........................................................ 523/152
See application file for complete search history.

(56) References Cited

U.S. PATENT DOCUMENTS

| | | | |
|---|---|---|---|
| 10,035,901 B2 * | 7/2018 | Nakajima | ................ C08L 9/00 |
| 2017/0174876 A1 | 6/2017 | Maejima | |
| 2017/0306131 A1 | 10/2017 | Nakajima | |

FOREIGN PATENT DOCUMENTS

| | | |
|---|---|---|
| JP | S58-109545 | 6/1983 |
| JP | H04-359938 | 12/1992 |
| JP | 2015-196814 | 11/2015 |
| WO | WO 2015/093316 | 6/2015 |
| WO | WO 2015/152398 | 10/2015 |

OTHER PUBLICATIONS

International Search Report for International Application No. PCT/JP2017/002688 dated Apr. 4, 2017, 4 pages, Japan.

* cited by examiner

*Primary Examiner* — Angela C Scott
(74) *Attorney, Agent, or Firm* — Thorpe North & Western

(57) ABSTRACT

A rubber composition includes a total of 45 to 65 parts by mass of an aromatic modified terpene resin having a softening point of 100° C. or higher and an oil per 100 parts by mass of a rubber component formed from 20 to 40 mass % of a butadiene rubber and from 60 to 80 mass % of another diene rubber containing an emulsion-polymerized styrene-butadiene rubber E-SBR1 having a bonded styrene content of 30 mass % or less and an emulsion-polymerized styrene-butadiene rubber E-SBR2 having a bonded styrene content of 35 mass % or greater; an amount of the E-SBR1 being from 85 to 92 mass % per 100 mass % of the emulsion-polymerized styrene-butadiene rubber; and a ratio (WB/WT) of the compounded amount of the butadiene rubber (WB) to the compounded amount of the aromatic modified terpene resin (WT) being from 0.5 to 3.0.

2 Claims, 1 Drawing Sheet

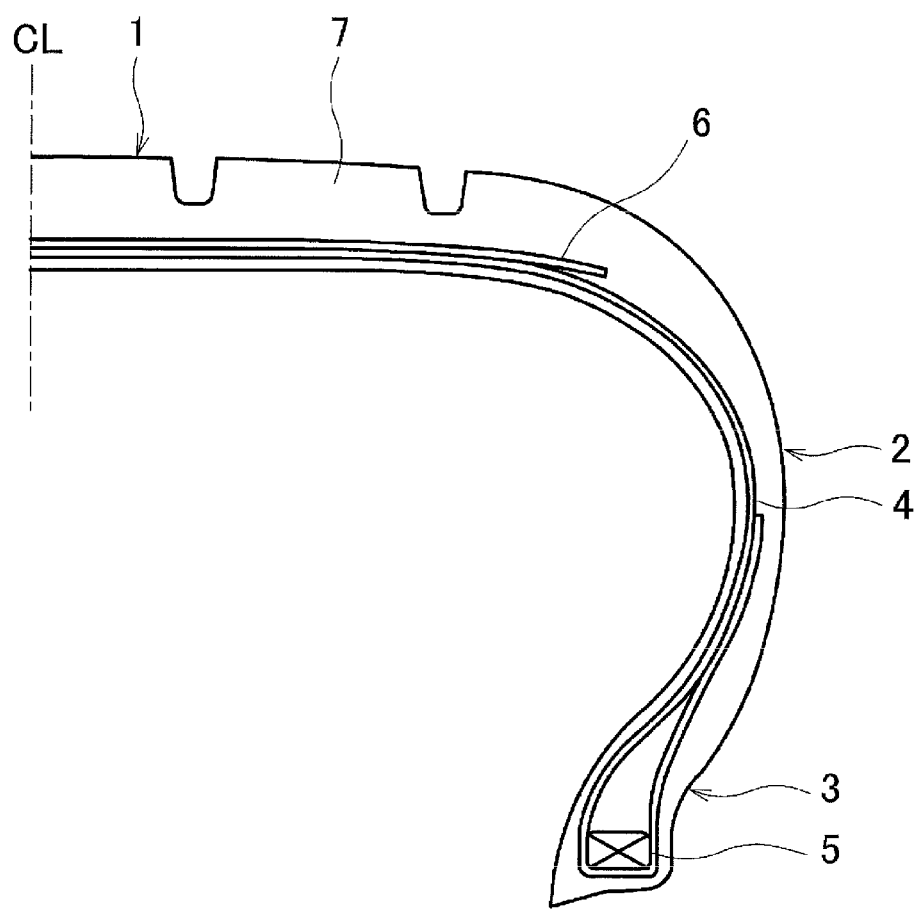

RUBBER COMPOSITION FOR TIRES

TECHNICAL FIELD

The present technology relates to a rubber composition for a tire, the composition reduces rolling resistance of a pneumatic tire as well as enhances wet grip performance, performance on snow, and processability.

BACKGROUND ART

In recent years, there has been a demand for environmentally friendly pneumatic tires to suppress worsening of the global environment. Therefore, it is necessary to reduce the rolling resistance of tires and to enhance the fuel economy performance. Furthermore, the pneumatic tire for all seasons requires performance on snow during traveling on a snow-covered road and excellent wet performance and wear resistance during travelling on a non-snow-covered road (wet road surface and dry road surface).

Examples of known techniques of reducing rolling resistance include reducing a compounded amount of carbon black in a rubber composition constituting a tire and using a polymer having a low glass transition temperature as a polymer. Such a rubber composition can achieve the effect of reducing rolling resistance; however, grip performance, especially wet grip performance, which is an important basic property of tires, tends to be reduced.

International Patent Publication No. WO 2015/093316 proposes to enhance fuel economy performance, wet grip performance, and wear resistance by a rubber composition for a tire, the rubber composition including a butadiene rubber, an emulsion-polymerized styrene-butadiene rubber having a bonded styrene content of 35 wt. % or greater, and an aromatic modified terpene resin. However, this rubber composition for a tire exhibits insufficient performance on snow during traveling on a snow-covered road, and improvement in processability of the rubber composition has been also demanded.

SUMMARY

The present technology provides a rubber composition for a tire, by which rolling resistance of a pneumatic tire is reduced and wet grip performance, performance on snow, and processability are enhanced to or beyond conventional levels.

A rubber composition for a tire according to an embodiment of the present technology includes a total of 45 to 65 parts by mass of an aromatic modified terpene resin having a softening point of 100° C. or higher and an oil per 100 parts by mass of a rubber component containing from 20 to 40 mass % of a butadiene rubber and from 60 to 80 mass % of another diene rubber; the rubber composition including 90 mass % or greater of an emulsion-polymerized styrene-butadiene rubber per 100 mass % of the other diene rubber; the emulsion-polymerized styrene-butadiene rubber being formed from an emulsion-polymerized styrene-butadiene rubber E-SBR1 having a bonded styrene content of 30 mass % or less and an emulsion-polymerized styrene-butadiene rubber E-SBR2 having a bonded styrene content of 35 mass % or greater; an amount of the E-SBR1 being from 85 to 92 mass % per 100 mass % of the emulsion-polymerized styrene-butadiene rubber; and a ratio (WB/WT) of the compounded amount of the butadiene rubber (WB) to the compounded amount of the aromatic modified terpene resin (WT) being from 0.5 to 3.0.

According to the rubber composition for a tire according to an embodiment of the present technology, the rubber composition can reduce rolling resistance when being formed into a pneumatic tire and can enhance wet grip performance, performance on snow, and processability equal to or beyond conventional levels because the rubber composition includes a total of 45 to 65 parts by mass of an aromatic modified terpene resin having a softening point of 100° C. or higher and an oil per 100 parts by mass of a rubber component formed from a butadiene rubber, an emulsion-polymerized styrene-butadiene rubber E-SBR1 having a bonded styrene content of 30 mass % or less, and an emulsion-polymerized styrene-butadiene rubber E-SBR2 having a bonded styrene content of 35 mass % or greater; an amount of the E-SBR1 is from 85 to 92 mass % per 100 mass % of the emulsion-polymerized styrene-butadiene rubber; and a ratio (WB/WT) of the compounded amount of the butadiene rubber (WB, parts by mass) to the compounded amount of the aromatic modified terpene resin (WT, parts by mass) is from 0.5 to 3.0.

The rubber composition for a tire according to an embodiment of the present technology can further contain from 50 to 120 parts by mass of a filler per 100 parts by mass of the rubber component, and the filler can contain 10 mass % or greater of silica having a CTAB (cetyl trimethylammonium bromide) specific surface area from 120 to 180 $m^2/g$.

A pneumatic tire in which the rubber composition for a tire according to an embodiment of the present technology is used can reduce rolling resistance and can enhance wet grip performance and performance on snow. Furthermore, a high quality tire described above can be stably obtained due to the production using the rubber composition for a tire having excellent processability.

BRIEF DESCRIPTION OF DRAWING

FIG. 1 is a cross-sectional view in a tire meridian direction that illustrates an example of an embodiment of a pneumatic tire in which a rubber composition for a tire according to an embodiment of the present technology is used.

DETAILED DESCRIPTION

A pneumatic tire illustrated in FIG. 1 includes a tread portion 1, a sidewall portion 2, and a bead portion 3. A carcass layer 4 is mounted between the left and right bead portions 3 and 3, and each end of the carcass layer 4 is folded over from the inside to the outside of the tire around a bead core 5. A belt layer 6 is disposed on the outer side in the tire radial direction of the carcass layer 4 in the tread portion 1, and a tread rubber 7 is disposed on the outer side of the belt layer 6. The rubber composition for a tire according to an embodiment of the present technology can be advantageously used in the tread rubber 7 and/or the sidewall portion 2. In particular, the rubber composition is preferably used in the tread portion 7.

In the rubber composition for a tire according to an embodiment of the present technology, the rubber component necessarily contains a butadiene rubber, an emulsion-polymerized styrene-butadiene rubber E-SBR1 having the bonded styrene content of 30 mass % or less, and an emulsion-polymerized styrene-butadiene rubber E-SBR2 having the bonded styrene content of 35 mass % or greater. As the butadiene rubber, a butadiene rubber that is typically used in rubber compositions for tires can be used. The content of the butadiene rubber is from 20 to 40 mass %, preferably from 24 to 38 mass %, and more preferably from 28 to 36 mass %, per 100 mass % of the rubber component. When the content of the butadiene rubber is less than 20%, rolling resistance becomes large, and braking performance on snow (performance on snow) is deteriorated. Furthermore, when the content of the butadiene rubber is greater than 40 mass %, wet grip performance is deteriorated, and processability is deteriorated.

The rubber component of an embodiment of the present technology is formed from 20 to 40 mass % of a butadiene rubber and from 60 to 80 mass % of another diene rubber. The other diene rubber always contains the emulsion-polymerized styrene-butadiene rubbers E-SBR1 and E-SBR2 and may optionally contain a natural rubber, an isoprene rubber, a solution-polymerized styrene-butadiene rubber, an emulsion-polymerized styrene-butadiene rubber having a bonded styrene content of greater than 30 mass % but less than 35 mass %, a butyl rubber, an acrylonitrile butadiene rubber, for example.

The other diene rubber contains 90 mass % or greater, preferably from 94 to 100 mass %, and more preferably from 98 to 100 mass %, total of the emulsion-polymerized styrene-butadiene rubbers E-SBR1 and E-SBR2 per 100 mass % of the other diene rubber. By allowing the emulsion-polymerized styrene-butadiene rubbers to be contained, processability, wet grip performance, performance on snow, wear resistance, and overall balance of cost of the rubber composition for a tire are enhanced.

The emulsion-polymerized styrene-butadiene rubber always includes the emulsion-polymerized styrene-butadiene rubber E-SBR 1 having a bonded styrene content of 30 mass % or less and the emulsion-polymerized styrene-butadiene rubber E-SBR2 having a bonded styrene content of 35 mass % or greater. In the present specification, the bonded styrene content is measured by infrared spectroscopy (the Hampton method).

By allowing the emulsion-polymerized styrene-butadiene rubber E-SBR1 having a bonded styrene content of 30 mass % or less to be contained, performance on snow can be enhanced. Also, processability can be enhanced. The content of the emulsion-polymerized styrene-butadiene rubber E-SBR1 is from 85 to 92 mass %, preferably from 86 to 91 mass %, and more preferably from 87 to 90 mass %, per 100 mass % of the emulsion-polymerized styrene-butadiene rubber. When the content of the emulsion-polymerized styrene-butadiene rubber E-SBR1 is less than 85 mass %, the effect of enhancing performance on snow cannot be sufficiently achieved. Furthermore, when the content of the emulsion-polymerized styrene-butadiene rubber E-SBR1 is greater than 92 mass %, wet grip performance is deteriorated.

By allowing the emulsion-polymerized styrene-butadiene rubber E-SBR2 having a bonded styrene content of 35 mass % or greater to be contained, wet grip performance can be enhanced. The content of the emulsion-polymerized styrene-butadiene rubber E-SBR2 is from 15 to 8 mass %, preferably from 14 to 9 mass %, and more preferably from 13 to 10 mass %, per 100 mass % of the emulsion-polymerized styrene-butadiene rubber. When the content of the emulsion-polymerized styrene-butadiene rubber E-SBR2 is greater than 15 mass %, the effect of enhancing performance on snow cannot be sufficiently achieved. Furthermore, when the content of the emulsion-polymerized styrene-butadiene rubber E-SBR2 is less than 8 mass %, wet grip performance is deteriorated.

In the rubber composition for a tire according to an embodiment of the present technology, wet grip performance is enhanced by blending an aromatic modified terpene resin. This is because the aromatic modified terpene resin enhances dispersibility of fillers, such as silica and carbon black, and further enhances miscibility between the filler and the diene rubber.

As the aromatic modified terpene resin, an aromatic modified terpene resin having the softening point of 100° C. or higher, and preferably from 120 to 170° C., is blended. When the softening point of the aromatic modified terpene resin is lower than 100° C., the effect of improving the wet performance cannot be sufficiently obtained. In the present specification, the softening point of the aromatic modified terpene resin is measured in accordance with JIS K6220-1 (ring and ball method).

When the compounded amount of the butadiene rubber is WB parts by mass and the compounded amount of the aromatic modified terpene resin is WT parts by mass per 100 parts by mass of the rubber component, the compounded amount of the aromatic modified terpene resin is adjusted so that the ratio of the WB to the WT (WB/WT) is from 0.5 to 3.0, and preferably from 1.0 to 2.5. When the ratio of the compounded amounts of the butadiene rubber to the aromatic modified terpene resin (WB/WT) is less than 0.5, rolling resistance becomes large and performance on snow is deteriorated. Furthermore, when the ratio of the compounded amounts (WB/WT) is greater than 3.0, wet grip performance is deteriorated. Also, less effect of enhancing performance on snow is exhibited.

In an embodiment of the present technology, as the aromatic modified terpene resin, an aromatic modified terpene resin obtained by polymerizing a terpene such as α-pinene, β-pinene, dipentene, and limonene, and at least one aromatic compound selected from the group consisting of styrene, α-methylstyrene, and vinyl toluene, is preferably used.

The rubber composition for a tire according to an embodiment of the present technology contains an appropriate amount of oil. Examples of the oil include oils typically blended in a rubber composition for a tire, such as aroma oil and process oil, and oil-extending component added in an emulsion-polymerized styrene-butadiene rubber and a solution-polymerized styrene-butadiene rubber. The compounded amount of the oil in the present specification refers to the total compounded amount of extender oil(s) contained in the diene rubber, such as emulsion-polymerized styrene-butadiene rubbers, and post-added oil component(s). The compounded amount of the oil component is selected so that the total amount of the oil and the aromatic modified terpene resin is from 45 to 65 parts by mass, and preferably from 50 to 60 parts by mass, per 100 parts by mass of the rubber component. When the total amount of the aromatic modified terpene resin and the oil is less than 45 parts by mass, wet grip performance is deteriorated and processability is deteriorated. Furthermore, when the total amount of the aromatic modified terpene resin and the oil is greater than 65 parts by mass, rolling resistance is deteriorated.

In the rubber composition for a tire according to an embodiment of the present technology, by allowing a filler to be contained, wet grip performance and tire durability can be enhanced while rolling resistance is made low.

The compounded amount of the filler is preferably from 50 to 120 parts by mass, and more preferably from 60 to 90 parts by mass, per 100 parts by mass of the diene rubber. When the compounded amount of the filler is less than 50 parts by mass, wet grip performance is deteriorated. Furthermore, when the compounded amount of the filler is greater than 120 parts by mass, the effect of reducing rolling resistance cannot be sufficiently achieved.

As the filler, silica is preferable and can reduce the rolling resistance when a tire is formed. The compounded amount of the silica is preferably 10 mass % or greater, and more preferably from 10 to 40 mass %, in the entire filler. When the compounded amount of the silica is less than 10 mass %, the effect of reducing rolling resistance cannot be sufficiently achieved.

The CTAB specific surface area of the silica is preferably from 120 to 180 $m^2/g$, and more preferably from 140 to 170 $m^2/g$. When the CTAB specific surface area of the silica is less than 120 $m^2/g$, wet performance is deteriorated and wear resistance is deteriorated. Furthermore, when the CTAB specific surface area of the silica is greater than 180 $m^2/g$, the effect of reducing rolling resistance cannot be sufficiently achieved. In this specification, the CTAB specific surface area of the silica is measured on the basis of JIS (Japanese Industrial Standard) K6217-3.

In an embodiment of the present technology, the type of the silica that is used may be silica that is ordinarily used in rubber compositions for tires such as, wet silica, dry silica, and surface-treated silica. Such silica can be appropriately selected from commercially available silicas and used.

Furthermore, it is preferable to blend a silane coupling agent together with the silica because dispersibility of the silica in the diene rubber can be enhanced. The compounded amount of the silane coupling agent is preferably from 3 to 15 mass %, and more preferably from 4 to 10 mass %, relative to the compounded amount of the silica. When the compounded amount of the silane coupling agent is less than 3 mass %, the dispersibility of the silica cannot be sufficiently enhanced. Furthermore, when the compounded amount of the silane coupling agent is greater than 15 mass %, the silane coupling agents aggregate and condense, and the desired effects cannot be achieved.

The type of silane coupling agent to be used is not particularly limited, but sulfur-containing silane coupling agents are preferable. Examples of the sulfur-containing silane coupling agent include bis-(3-triethoxysilylpropyl) tetrasulfide, bis-(3-triethoxysilylpropyl)disulfide, 3-trimethoxysilylpropyl benzothiazole tetrasulfide, γ-mercaptopropyl triethoxysilane, and 3-octanoylthiopropyl triethoxysilane.

The rubber composition for a tire according to an embodiment of the present technology may contain another filler besides the silica as the filler. Examples of the other filler include carbon black, clay, calcium carbonate, aluminum hydroxide, talc, and mica. Among these, carbon black is preferable. By allowing the carbon black to be contained, strength of the rubber composition can be enhanced and tire durability when a tire is formed can be enhanced. One type of these other fillers can be used, or a plurality of types can be used in a combination.

The rubber composition for a tire according to an embodiment of the present technology may also contain various types of additives that are commonly used in rubber compositions, such as vulcanization and crosslinking agents, anti-aging agents, and plasticizers. These additives may be kneaded according to any common method to form a rubber composition and may be used in vulcanization or crosslinking. The compounded amount of these additives may be any quantity as in the related art, as long as the object of the present technology is not impaired.

The rubber composition for a tire can be produced by mixing each of the components described above using a commonly used rubber kneading machine such as a Banbury mixer, a kneader, and a roller.

The rubber composition for a tire according to an embodiment of the present technology can constitute a tread portion and/or a sidewall portion of a pneumatic tire. The rubber composition for a tire is preferably used in at least one portion selected from these portions. Among these, application in the tread portion is particularly preferred. A pneumatic tire that uses the rubber composition for a tire according to an embodiment of the present technology in these portions can reduce rolling resistance, enhance fuel economy performance, and enhance braking performance on snow and wet grip performance equal to or beyond conventional levels.

The pneumatic tire that uses the rubber composition for a tire described above in a tread portion and/or a sidewall portion is preferably a pneumatic tire for all seasons. The pneumatic tire of an embodiment of the present technology can reduce rolling resistance and enhance wet grip performance and performance on snow equal to or beyond conventional levels. Furthermore, a high quality all-season tire having a low rolling resistance, excellent wet grip performance, and excellent performance on snow can be stably obtained due to the production using the rubber composition for a tire having excellent process ability.

The present technology is further described below by examples. However, the scope of the present technology is not limited to these examples.

Examples

Compounding ingredients other than sulfur and vulcanization accelerators were weighed according to each of the compounding proportions for the 19 types of rubber compositions shown in Tables 1 and 2 (Examples 1 to 9, Standard Example, and Comparative Examples 1 to 9). These compounding ingredients were kneaded in a 16 L Banbury Mixer for 5 minutes, discharged, and cooled at room temperature. This was supplied to an open roll, and the sulfur and the vulcanization accelerator were added thereto and mixed to prepare a rubber composition for a tire. In Tables 1 and 2, since the styrene-butadiene rubbers E-SBR-1, E-SBR-2, and S-SBR contain oil-extending components, the net compounded amounts of SBRs were shown together in parentheses. In Tables 1 and 2, the compounded amount of the butadiene rubber is shown as WB, the compounded amount of the aromatic modified terpene resin is shown as WT, and the mass ratio (WB/WT) is shown. Furthermore, the mass fraction of the emulsion-polymerized styrene-butadiene rubber E-SBR-1 per 100 mass % of all the emulsion-polymerized styrene-butadiene rubbers is shown as "Fraction of E-SBR-1 (mass %)". Furthermore, the total amount of the oil-extending components of E-SBR-1, E-SBR2, and S-SBR, the process oil, and the aromatic modified terpene resin is shown in the rows of "Total amount of aromatic modified terpene resin and oil (parts by mass)".

The Mooney viscosity of each of the 18 types of the obtained rubber compositions was measured by the following method. Furthermore, by using each of the obtained 18 types of the rubber compositions, a vulcanized rubber sheet was produced by vulcanizing at 160° C. for 20 minutes by using a mold having a predetermined shape. A dynamic viscoelasticity was measured by the following methods and used as indicators for rolling resistance, wet grip performance, and performance on snow.

Mooney Viscosity

The Mooney viscosity of the obtained rubber composition was measured in accordance with HS K6300-1:2001 using an L-type rotor in a Mooney viscometer under the conditions of a preheating time of 1 minute, a rotor rotation time of 4 minutes, and 100° C. The obtained results are shown in the rows of "Processability" in Tables 1 and 2 as index values with the value of Standard Example being assigned the index value of 100. A smaller index value indicates a lower Mooney viscosity and thus indicates superior processability.

Dynamic Viscoelasticity: Tan δ at 60° C. and 0° C. and E' at −10° C.

Using a viscoelastic spectrometer, available from Toyo Seiki Seisaku-sho, Ltd., the dynamic viscoelasticity of the obtained vulcanized rubber sheet was measured under conditions at an initial strain of 10%, an amplitude of ±2%, and a frequency of 20 Hz. The values of tan δ at temperatures of 60° C. and 0° C., and E' at −10° C. were determined. The obtained results are shown in the rows of "Rolling resistance", "Wet grip performance", and "Braking performance on snow" in Tables 1 and 2 as index values with the value of Standard Example being assigned the index value of 100. A smaller "rolling resistance" index value indicates a lower tan δ (60° C.) value and thus indicates lower rolling resistance and superior fuel consumption performance of a formed tire. A larger "wet grip performance" index value indicates a greater tan δ (0° C.) and thus indicates superior wet grip performance of a formed tire. Furthermore, a smaller "braking performance on snow" index value indicates a smaller E' (−10° C.) value and thus indicates superior braking performance on snow of a formed tire.

TABLE 1-1

| | | | | | | |
|---|---|---|---|---|---|---|
| Total amount of aromatic modified terpene resin and oil | (parts by mass) | 54.4 | 50.6 | 61.9 | 54.4 | 102.4 |
| Mass ratio (WB/WT) | — | | 2.50 | 2.50 | 2.50 | 2.50 | 0.45 |
| Processability | Index value | 100 | 101 | 98 | 110 | 90 |
| Rolling resistance | Index value | 100 | 98 | 105 | 94 | 115 |
| Wet grip performance | Index value | 100 | 97 | 104 | 106 | 115 |
| Braking performance on snow | Index value | 100 | 97 | 105 | 100 | 115 |

TABLE 1-2

| | | Comparative Example 5 | Comparative Example 6 | Comparative Example 7 | Comparative Example 8 | Comparative Example 9 |
|---|---|---|---|---|---|---|
| BR (WB) | Parts by mass | 35 | 35 | 35 | 35 | 35 |
| E-SBR-1 | Parts by mass | 79.3 (57.7) | 79.3 (57.7) | 79.3 (57.7) | 89.4 (65) | |
| E-SBR-2 | Parts by mass | 10.0 (7.3) | 10.0 (7.3) | 10.0 (7.3) | | 89.4 (65) |
| S-SBR | Parts by mass | | | | | |
| Carbon black | Parts by mass | 60 | 60 | 60 | 60 | 60 |
| Silica-1 | Parts by mass | 20 | 20 | 20 | 20 | 20 |
| Coupling agent | Parts by mass | 0.5 | 0.5 | 0.5 | 0.5 | 0.5 |
| Aromatic modified terpene resin (WT) | Parts by mass | 5 | 20 | 20 | 20 | 20 |
| Process oil | Parts by mass | 31 | | 40 | 16 | 16 |
| Stearic acid | Parts by mass | 2.5 | 2.5 | 2.5 | 2.5 | 2.5 |
| Zinc oxide | Parts by mass | 2.5 | 2.5 | 2.5 | 2.5 | 2.5 |
| Anti-aging agent | Parts by mass | 2.0 | 2.0 | 2.0 | 2.0 | 2.0 |
| Vulcanization accelerator-1 | Parts by mass | 1.7 | 1.7 | 1.7 | 1.7 | 1.7 |
| Vulcanization accelerator-2 | Parts by mass | 0.4 | 0.4 | 0.4 | 0.4 | 0.4 |
| Sulfur | Parts by mass | 1.4 | 1.4 | 1.4 | 1.4 | 1.4 |
| Fraction of E-SBR-1 | (Mass %) | 88.8 | 88.8 | 88.8 | 100.0 | — |
| Total amount of aromatic modified terpene resin and oil | (parts by mass) | 60.4 | 44.4 | 84.4 | 60.4 | 60.4 |
| Mass ratio (WB/WT) | — | 7.00 | 1.75 | 1.75 | 1.75 | 1.75 |
| Processability | Index value | 100 | 103 | 96 | 98 | 97 |
| Rolling resistance | Index value | 98 | 100 | 102 | 95 | 103 |
| Wet grip performance | Index value | 97 | 98 | 100 | 98 | 109 |

TABLE 1-2-continued

|  |  | Comparative Example 5 | Comparative Example 6 | Comparative Example 7 | Comparative Example 8 | Comparative Example 9 |
|---|---|---|---|---|---|---|
| Braking performance on snow | Index value | 102 | 99 | 97 | 94 | 102 |

TABLE 2-1

|  |  | Example 1 | Example 2 | Example 3 | Example 4 | Example 5 |
|---|---|---|---|---|---|---|
| BR (WB) | Parts by mass | 35 | 35 | 35 | 35 | 35 |
| E-SBR-1 | Parts by mass | 79.3 (57.7) | 79.3 (57.7) | 79.3 (57.7) | 79.3 (57.7) | 79.3 (57.7) |
| E-SBR-2 | Parts by mass | 10.0 (7.3) | 10.0 (7.3) | 10.0 (7.3) | 10.0 (7.3) | 10.0 (7.3) |
| Carbon black | Parts by mass | 60 | 30 | 70 | 75 | 60 |
| Silica-1 | Parts by mass | 20 | 10 | 30 | 5 |  |
| Silica-2 | Parts by mass |  |  |  |  | 20 |
| Coupling agent | Parts by mass | 0.5 | 0.5 | 0.5 | 0.5 | 0.5 |
| Aromatic modified terpene resin (WT) | Parts by mass | 20 | 20 | 20 | 20 | 20 |
| Process oil | Parts by mass | 16 | 16 | 16 | 16 | 16 |
| Stearic acid | Parts by mass | 2.5 | 2.5 | 2.5 | 2.5 | 2.5 |
| Zinc oxide | Parts by mass | 2.5 | 2.5 | 2.5 | 2.5 | 2.5 |
| Anti-aging agent | Parts by mass | 2.0 | 2.0 | 2.0 | 2.0 | 2.0 |
| Vulcanization accelerator-1 | Parts by mass | 1.7 | 1.7 | 1.7 | 1.7 | 1.7 |
| Vulcanization accelerator-2 | Parts by mass | 0.4 | 0.4 | 0.4 | 0.4 | 0.4 |
| Sulfur | Parts by mass | 1.4 | 1.4 | 1.4 | 1.4 | 1.4 |
| Fraction of E-SBR-1 | (Mass %) | 88.8 | 88.8 | 88.8 | 88.8 | 88.8 |
| Total amount of aromatic modified terpene resin and oil | (parts by mass) | 60.4 | 60.4 | 60.4 | 60.4 | 60.4 |
| Mass ratio (WB/WT) | — | 1.75 | 1.75 | 1.75 | 1.75 | 1.75 |
| Processability | Index value | 98 | 94 | 100 | 97 | 96 |
| Rolling resistance | Index value | 97 | 92 | 99 | 98 | 95 |
| Wet grip performance | Index value | 104 | 101 | 105 | 103 | 102 |
| Braking performance on snow | Index value | 97 | 93 | 98 | 97 | 96 |

TABLE 2-2

|  |  | Example 6 | Example 7 | Example 8 | Example 9 |
|---|---|---|---|---|---|
| BR (WB) | Parts by mass | 25 | 40 | 35 | 35 |
| E-SBR-1 | Parts by mass | 93.1 (67.7) | 72.5 (52.7) | 83.1 (60.4) | 81.1 (59) |
| E-SBR-2 | Parts by mass | 10.0 (7.3) | 10.0 (7.3) | 13.8 (10) | 8.3 (6) |
| Carbon black | Parts by mass | 60 | 60 | 60 | 60 |
| Silica-1 | Parts by mass | 20 | 20 | 20 | 20 |
| Silica-2 | Parts by mass |  |  |  |  |

TABLE 2-2-continued

| | | Example 6 | Example 7 | Example 8 | Example 9 |
|---|---|---|---|---|---|
| Coupling agent | Parts by mass | 0.5 | 0.5 | 0.5 | 0.5 |
| Aromatic modified terpene resin (WT) | Parts by mass | 20 | 20 | 20 | 20 |
| Process oil | Parts by mass | 16 | 16 | 16 | 16 |
| Stearic acid | Parts by mass | 2.5 | 2.5 | 2.5 | 2.5 |
| Zinc oxide | Parts by mass | 2.5 | 2.5 | 2.5 | 2.5 |
| Anti-aging agent | Parts by mass | 2.0 | 2.0 | 2.0 | 2.0 |
| Vulcanization accelerator-1 | Parts by mass | 1.7 | 1.7 | 1.7 | 1.7 |
| Vulcanization accelerator-2 | Parts by mass | 0.4 | 0.4 | 0.4 | 0.4 |
| Sulfur | Parts by mass | 1.4 | 1.4 | 1.4 | 1.4 |
| Fraction of E-SBR-1 | (Mass %) | 90.3 | 87.8 | 88.8 | 88.8 |
| Total amount of aromatic modified terpene resin and oil | (parts by mass) | 64.1 | 58.5 | 60.4 | 60.4 |
| Mass ratio (WB/WT) | | — | 1.25 | 2.00 | 1.75 | 1.75 |
| Processability | Index value | 97 | 99 | 98 | 98 |
| Rolling resistance | Index value | 99 | 96 | 97 | 97 |
| Wet grip performance | Index value | 106 | 102 | 105 | 103 |
| Braking performance on snow | Index value | 99 | 96 | 98 | 96 |

The types of raw materials used in Tables 1 and 2 are shown below.

BR: butadiene rubber; Nipol BR1220, available from Zeon Corporation

E-SBR-1: emulsion-polymerized styrene-butadiene rubber, available from Zeon Corporation, Nipol 1723, having a bonded styrene content of 23.4 mass % and containing 37.5 parts by mass of oil-extending component E-SBR-2: emulsion-polymerized styrene-butadiene rubber, available from Zeon Corporation, Nipol 1739, having a bonded styrene content of 38.9 mass % and containing 37.5 parts by mass of oil-extending component S-SBR: solution-polymerized styrene-butadiene rubber, available from Zeon Corporation, Nipol NS460, having a bonded styrene content of 26.1 mass % and containing 37.5 parts by mass of oil-extending component Carbon black: Sho Black 339, available from Cabot Japan K.K.

Silica-1: Zeosil 1165MP, available from Rhodia (CTAB specific surface area: 155 m$^2$/g)

Silica-2: Zeosil 115GR, available from Rhodia (CTAB specific surface area: 110 m$^2$/g)

Coupling agent: sulfur-containing silane coupling agent; Si69, available from Evonik Degussa Aromatic modified terpene resin: YS Resin TO-125, available from Yasuhara Chemical Co., Ltd.; softening point: 125° C.

Process oil: Extract No. 4S, available from Showa Shell Sekiyu K.K.

Stearic acid: beads stearic acid, available from NOF Corporation

Zinc oxide: Zinc Oxide III, available from Seido Chemical Industry Co., Ltd.

Anti-aging agent: 6PPD, available from Flexsys

Vulcanization accelerator-1: NOCCELER CZ-G, available from Ouchi-Shinko Chemical Industrial Co., Ltd.

Vulcanization accelerator-2: Soxinol D-G, available from Sumitomo Chemical Co., Ltd.

Sulfur: "Golden Flower" oil-treated sulfur powder, available from Tsurumi Chemical Industry Co., Ltd.

As is clear from the results in Tables 1 and 2, all of the rubber compositions for tires of Examples 1 to 9 was capable of reducing rolling resistance and enhancing wet grip performance and braking performance on snow, compared to the those of the rubber composition for a tire of Standard Example. Furthermore, the Mooney viscosity of the rubber compositions for tires was small and processability was excellent.

On the other hand, as is clear from the results of Table 1, the rubber composition for a tire of Comparative Example 1 had poor processability and poor wet grip performance because the content of the butadiene rubber was greater than 40 mass %.

The rubber composition for a tire of Comparative Example 2 had a large rolling resistance and poor braking performance on snow because the content of the butadiene rubber was less than 20 mass %.

The rubber composition for a tire of Comparative Example 3 exhibited poor processability because the rubber composition contained the solution-polymerized styrene-butadiene rubber S-SBR having a bonded styrene content of 30 mass % or less in place of the emulsion-polymerized styrene-butadiene rubber E-SBR-1 having a bonded styrene content of 30 mass % or less.

The rubber composition for a tire of Comparative Example 4 had a large rolling resistance and poor braking performance on snow because the mass ratio of the butadiene rubber to the aromatic modified terpene resin (WB/WT) was less than 0.5.

The rubber composition for a tire of Comparative Example 5 had poor wet grip performance and poor braking performance on snow because the mass ratio of the butadiene rubber to the aromatic modified terpene resin (WB/WT) was greater than 3.0.

The rubber composition for a tire of Comparative Example 6 had poor processability and poor wet grip performance because the total amount of the aromatic modified terpene resin and the oil was less than 45 parts by mass.

The rubber composition for a tire of Comparative Example 7 had a large rolling resistance because the total amount of the aromatic modified terpene resin and the oil was greater than 65 parts by mass.

The rubber composition for a tire of Comparative Example 8 had poor wet grip performance because the emulsion-polymerized styrene-butadiene rubber E-SBR-2 having a bonded styrene content of 35 mass % or greater was not contained.

The rubber composition for a tire of Comparative Example 9 had a large rolling resistance and poor braking performance on snow because the rubber composition does not contain the emulsion-polymerized styrene-butadiene rubber E-SBR-1 having a bonded styrene content of 30 mass % or less.

The invention claimed is:
1. A rubber composition for a tire, the rubber composition comprising
a total of 45 to 65 parts by mass of an aromatic modified terpene resin having a softening point of 100° C. or higher and an oil per 100 parts by mass of a rubber component containing from 20 to 40 mass % of a butadiene rubber and from 60 to 80 mass % of another diene rubber;

the rubber composition comprising 90 mass % or greater of an emulsion-polymerized styrene-butadiene rubber per 100 mass % of the other diene rubber;

the emulsion-polymerized styrene-butadiene rubber being formed from an emulsion-polymerized styrene-butadiene rubber E-SBR1 having a bonded styrene content of 30 mass % or less and an emulsion-polymerized styrene-butadiene rubber E-SBR2 having a bonded styrene content of 35 mass % or greater;

an amount of the E-SBR1 being from 85 to 92 mass % per 100 mass % of the emulsion-polymerized styrene-butadiene rubber;

a ratio (WB/WT) of a compounded amount of the butadiene rubber (WB) to a compounded amount of the aromatic modified terpene resin (WT) being from 0.5 to 3.0; and from 50 to 120 parts by mass of filler containing silica and carbon black per 100 parts by mass of the rubber component, the filler containing 10 mass % or greater of silica having a CTAB (cetyl trimethylammonium bromide) specific surface area of 120 to 180 $m^2/g$.

2. A pneumatic tire using the rubber composition for a tire described in claim 1.

\* \* \* \* \*